US006879426B1

United States Patent
Weiner

(10) Patent No.: US 6,879,426 B1
(45) Date of Patent: Apr. 12, 2005

(54) SYSTEM AND METHOD FOR PROGRAMMABLE POLARIZATION-INDEPENDENT PHASE COMPENSATION OF OPTICAL SIGNALS

(75) Inventor: Andrew Marc Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 14 days.

(21) Appl. No.: 10/178,949

(22) Filed: Jun. 24, 2002

Related U.S. Application Data
(60) Provisional application No. 60/303,763, filed on Jul. 6, 2001.

(51) Int. Cl.[7] .............................. G02F 1/01; G02B 26/00
(52) U.S. Cl. .......................................... 359/279; 398/81
(58) Field of Search .......................... 359/279; 398/81; 372/28, 29.023

(56) References Cited

U.S. PATENT DOCUMENTS 6,275,623 B1 * 8/2001 Brophy et al. ................. 385/14
6,327,068 B1 * 12/2001 Silberberg et al. .......... 359/239

* cited by examiner

Primary Examiner—Scott J. Sugarman
Assistant Examiner—Richard Hanig
(74) Attorney, Agent, or Firm—Schwegman, Lundberg, Woessner & Kluth, P.A.

(57) ABSTRACT

A system and method for programmable phase compensation of optical signals is disclosed. The systems and methods include the use of a polarization-independent spatial light modulator (PI-SLM), so that the state of polarization (SOP) of the incoming optical signal need not be known. The system includes a first dispersive module that spatially separates the optical signal into its frequency components. The frequency components are spread over the active area of the PI-SLM. The active area of the PI-SLM includes an array of independently programmable addressable regions capable of altering the phase of the light incident thereon. An exemplary application of the invention is chromatic dispersion compensation. By knowing the amount of chromatic dispersion in the optical signal, or alternatively, by knowing the amount of chromatic dispersion to be introduced into the optical signal downstream, the appropriate phase adjustments can be made to each frequency component of the signal. The phase-adjusted frequency components are then recombined via a second dispersive module to form a compensated optical signal.

58 Claims, 14 Drawing Sheets

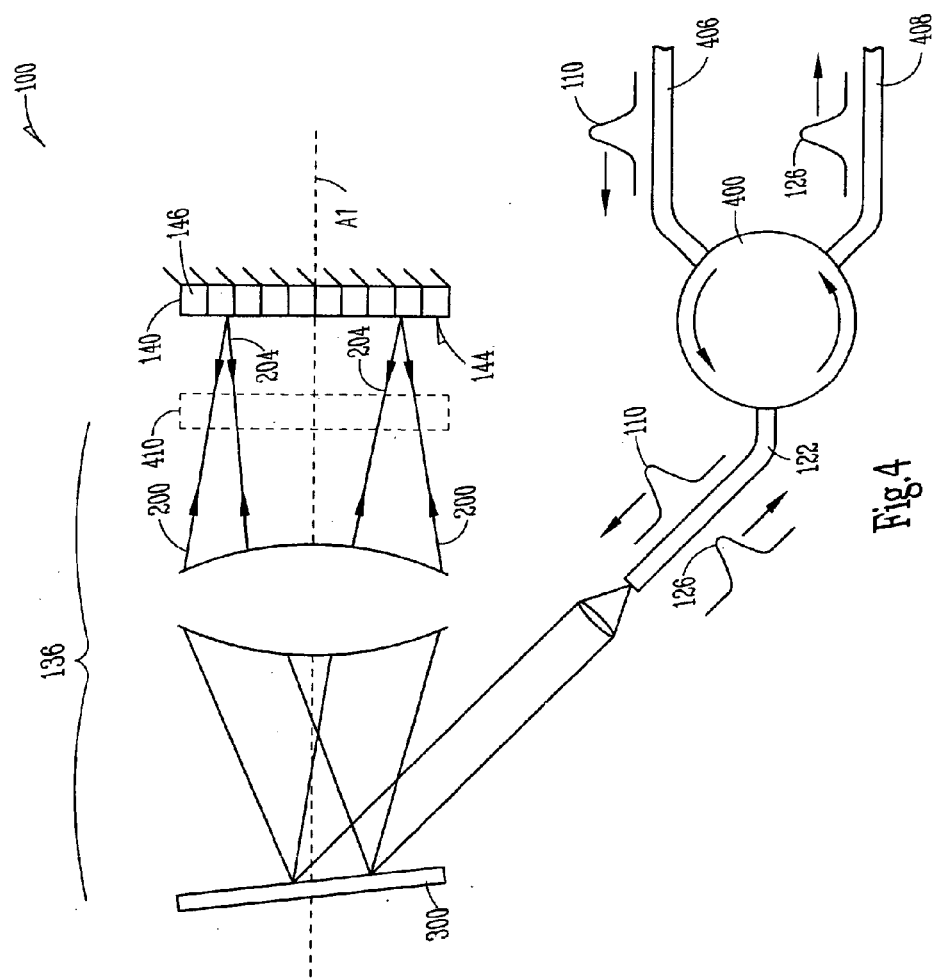

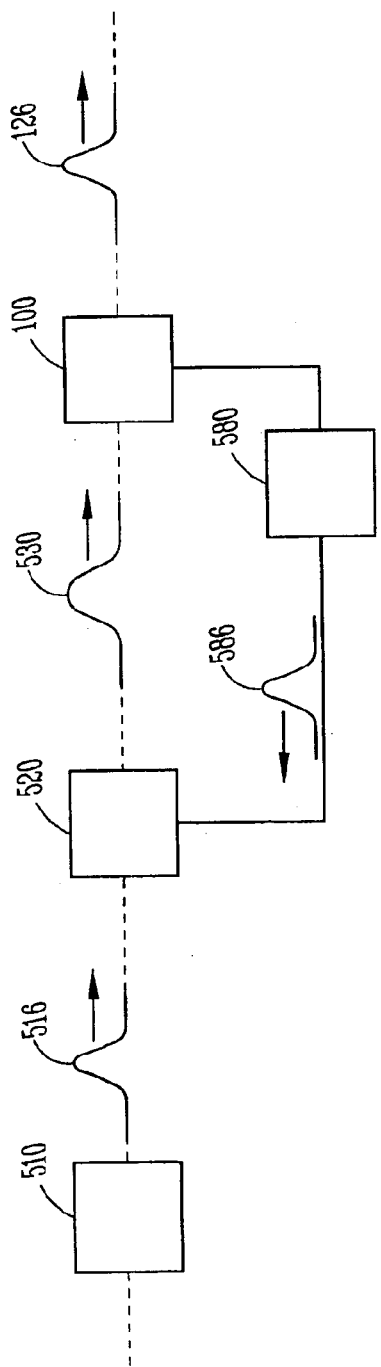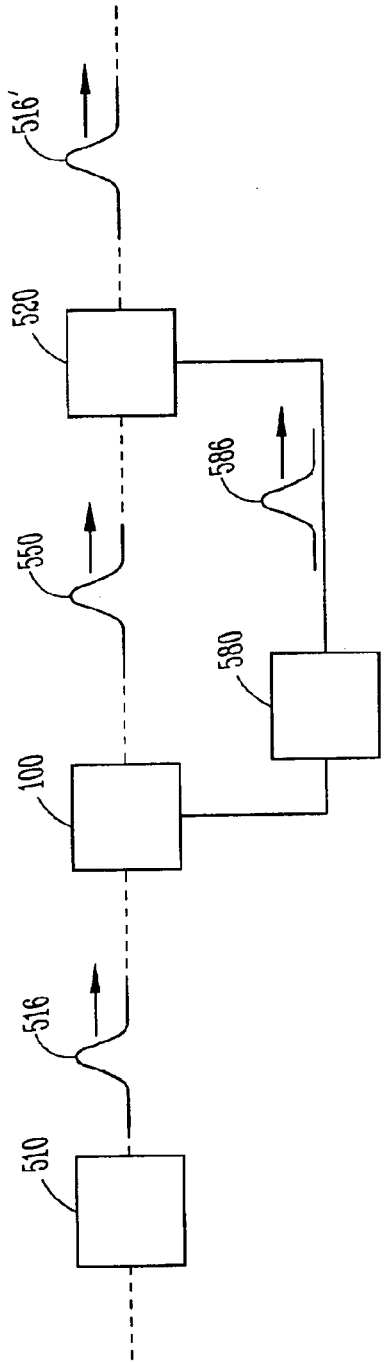

SYSTEM AND METHOD FOR PROGRAMMABLE POLARIZATION-INDEPENDENT PHASE COMPENSATION OF OPTICAL SIGNALS

CROSS-REFERENCE TO RELATED APPLICATION

This application claims priority under 35 U.S.C. 119(e) from U.S. Provisional Application Ser. No. 60/303,763, filed Jul. 6, 2001, which application is incorporated herein by reference.

FIELD OF THE INVENTION

The present invention relates to optical communications and the processing of optical signals, and in particular relates to systems and methods for adjusting the phase of optical signals having an arbitrary polarization.

BACKGROUND OF THE INVENTION

The transmission of information over optical fibers is becoming pervasive. This is motivated, at least in part, because optical fiber offers much larger bandwidths than electrical cable. Moreover, optical fiber can connect nodes over large distances and transmit optical information between such nodes at the speed of light.

There are, however, a number of physical effects that limit the ability to transmit large amounts of information over an optical fiber. One such effect is called "chromatic dispersion," which refers to the spreading of a pulse of light (i.e., an "optical signal" or "lightwave signal") due to the variation in the propagation velocity of the different optical frequencies (or equivalently, wavelengths) making up the pulse.

Chromatic dispersion has two root causes. The first is due to the fact that silica of the optical fiber, like any optical material, has an index of refraction that is frequency-dependent. This is referred to as "material dispersion." The second cause is due to the nature of the propagation of light down the fiber and is referred to as "waveguide dispersion." The power distribution of the light between the core and the cladding of the fiber is a function of frequency. This means the "effective index" or "propagation constant" of the waveguide mode is a function of frequency as well, which causes the optical signal to disperse as it travels down the fiber.

In optical fiber communication systems, chromatic dispersion causes individual bits to broaden, since each bit is composed of a range of optical frequencies that separate due to their different propagation velocities. Such broadening eventually leads to intersymbol interference due to overlap of adjacent bits, which results in unacceptable data transmission errors. Chromatic dispersion compensation is usually needed to obtain the required performance in lightwave transmission systems operating at per channel data rates of 10 Gb/s or above. For example, the dispersion of a standard single mode fiber (SMF) at the key lightwave communications wavelength of 1550 nm is roughly 17 ps/nm-km. For a 10 Gb/s transmission system, the optical bandwidth per channel is typically a minimum of 0.1 nm, and is often greater. Transmission through a 30 km span of SMF would lead to a chromatic dispersive broadening of the signal of 51 ps, which is 50% of the bit period (100 ps).

Such a broadening is unacceptably large and would lead to a large error rate. The problem becomes much more acute with higher data rates, such as 40 Gb/s per channel systems currently under development. The problem will even become more acute for the anticipated higher data rate systems presently being contemplated. Further details about the nature of chromatic dispersion in optical fibers and the consequences for optical networks can be found in the book by Ramaswami and Sivarajan, entitled *Optical Networks, a Practical Perspective*, Morgan Kaufmann Publishers, in chapter 2.3.

Efforts have been made in the past to develop systems and methods for compensating for the effects of chromatic dispersion. For example, dispersion-compensating fibers (DCF) have been developed that have the opposite sign of dispersion compared to conventional single mode fibers have been developed and are widely deployed as compensators. However, the DCF technique lacks the ability to easily fine tune the spectral variation of the dispersion and involves a relatively large insertion loss for long fiber links. Chirped fiber Bragg gratings can also compensate fixed amounts of dispersion, but only for one WDM channel at a time. Both techniques lack the ability to reprogram or programmably fine tune the amount of dispersion and its spectral profile, which is likely to be needed to develop higher rate lightwave communication systems.

A number of workers have used programmable pulse shapers to programmably compensate chromatic dispersion in high-power femtosecond pulse amplifiers and in nonlinear optical pulse compression systems. A variety of spatial light modulator (SLM) types have been used, including liquid crystals, acousto-optic modulators, and deformable mirrors.

By way of examples, the use of a deformable-mirror SLM to correct chromatic dispersion is described in the paper by E. Zeek et al., *Pulse compression by use of deformable mirrors*, Opt. Lett, 24, 493–495 (1999). The use of an arrayed waveguide grating (AWG) rather than a bulk diffraction grating as the spectral disperser is described in the paper by H. Takenouchi et al., entitled 2×40-*channel dispersion-slope compensator for 40-Gbit/s WDM transmission systems covering entire C- and L-bands*, presented at the Optical Fiber Communications Conference (OFC), sponsored by the Optical Society of America, Anaheim, Calif., March 2001; however, in this paper a fixed phase mask is used in place of an SLM, with the result that the dispersion is not programmable. Further, the article by C. Chang et al. entitled *Dispersion-free fiber transmission for femtosecond pulses by use of a dispersion-compensating fiber and a programmable pulse shaper*, Opt. Lett. 23, 283–285 (1998) describes chromatic dispersion compensation using a liquid crystal SLM.

These and the other efforts described in the cited references all have the shortcoming that the operation of the dispersion compensation system depends on the SOP and/or that the system is not sufficiently programmable to handle the dispersion slope and higher-order dispersion terms or to reprogram the dispersion profile to accommodate changes in the length of optical fiber links in a switched optical networking environment. The dependence of a chromatic dispersion compensation system on the SOP of the input lightwave is major shortcoming because the SOP of light having traveled through an optical fiber system is scrambled and can vary with time, resulting in polarization-dependent loss (PDL). Further, the inability to robustly perform phase encoding of the signal reduces the ability to accurately compensate for the chromatic dispersion characteristics of a given optical fiber system.

Accordingly, what is needed is a system and method that can programmably compensate, with a high degree of accuracy, an optical signal for chromatic dispersion effects of an optical fiber, while also being insensitive to the SOP of the light signal being processed.

SUMMARY OF THE INVENTION

The present invention relates to optical communications and the processing of optical signals, and in particular relates to systems and methods for adjusting the phase of optical signals having an arbitrary polarization. The present invention finds particularly utility in correcting, reducing or otherwise adjusting chromatic dispersion in optical signals.

The present invention provides the capability to programmably control pulse broadening due to chromatic dispersion in chromatically dispersive media, and in particular in optical fiber communications systems and networks. This capability allows optical fiber lightwave communication systems to run at higher speeds over longer distances by compensating chromatic dispersion, which is regarded as a key impairment for high-performance lightwave communication systems. The present invention can be applied both to very high-speed time-division multiplexed (TDM) and to wavelength division multiplexed (WDM) optical communications. In the case of WDM systems, several WDM channels can be independently compensated and can be programmed to achieve nearly arbitrary dispersion profiles in order to match the system requirements. The chromatic dispersion compensator can handle input optical signals with arbitrary and unspecified state of polarization, and may be configured to provide substantially zero PDL.

Accordingly, a first aspect of the invention is a system for programmably adjusting the phase of the frequency components of an optical signal of arbitrary polarization. The system includes a first dispersive module arranged to receive and disperse the optical signal into its frequency components. A polarization-independent spatial light modulator (PI-SLM) having an active area comprising a plurality of independently programmable addressable regions is arranged to receive the frequency components on the active area. The PI-SLM may be, for example, a liquid-crystal SLM adapted for polarization-independent operation, or a programmably deformable mirror. A controller is coupled to the PI-SLM. During operation of the system, the controller causes the PI-SLM to independently adjust the phase of one or more of the frequency components.

In an example embodiment of the invention, the phase-adjustment is performed to alter chromatic dispersion in the optical signal.

A second aspect of the invention is a method of programmably adjusting the phase of the frequency components of an optical signal of arbitrary polarization to adjust the amount of chromatic dispersion in the signal. The method includes spatially dispersing frequency components of the optical signal onto a polarization-independent spatial light modulator (PI-SLM) over an active area having a plurality of independently programmable addressable regions. The method further includes independently adjusting one or more of the addressable regions to alter the phase of the corresponding frequency components incident thereon. The phase-altered signals are then recombined to produce a compensated optical signal.

A third aspect of the invention includes the above described method, and involves adjusting the polarization of the optical signal frequency components so as to reduce any polarization-dependent loss (PDL) due to dispersing the optical signal into its frequency components and/or recombining the phase-altered frequency components to form the compensated optical signal.

A fourth aspect of the invention involves using the chromatic dispersion compensation system of the present invention to compensate for chromatic dispersion in channel optical signals in a wavelength-division multiplexed (WDM) signal. This is accomplished by dividing up the active area of the PI-SLM into sets of addressable regions corresponding to the frequency components of the different channel optical signals, and then compensating the frequency components of each channel signal. The compensated channel signals can then be detected, transferred to another optical system, or recombined with a multiplexer to form a compensated WDM signal.

BRIEF DESCRIPTION OF THE DRAWINGS

FIG. 4 is a schematic diagram of an on-axis reflection-mode embodiment of the chromatic dispersion compensation system of FIG. 1 that employs a single optical fiber as the input and output optical fiber, and a circulator connected to first and second optical fibers and the single optical fiber;

FIGS. 7C and 7D are schematic diagrams of embodiments of optical processing systems that includes the chromatic dispersion compensation system of the present invention, wherein a detection system is used to interrogate the optical system to measure its chromatic dispersion and to provide information for the chromatic dispersion compensation system to perform post-compensation (FIG. 7C) or pre-compensation (FIG. 7D) of an optical signal;

Like reference symbols in the various drawings indicate like elements.

DETAILED DESCRIPTION OF THE INVENTION

The present invention relates to optical communications and the processing of optical signals, and in particular relates to systems and methods for adjusting the phase of optical signals having an arbitrary polarization. In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
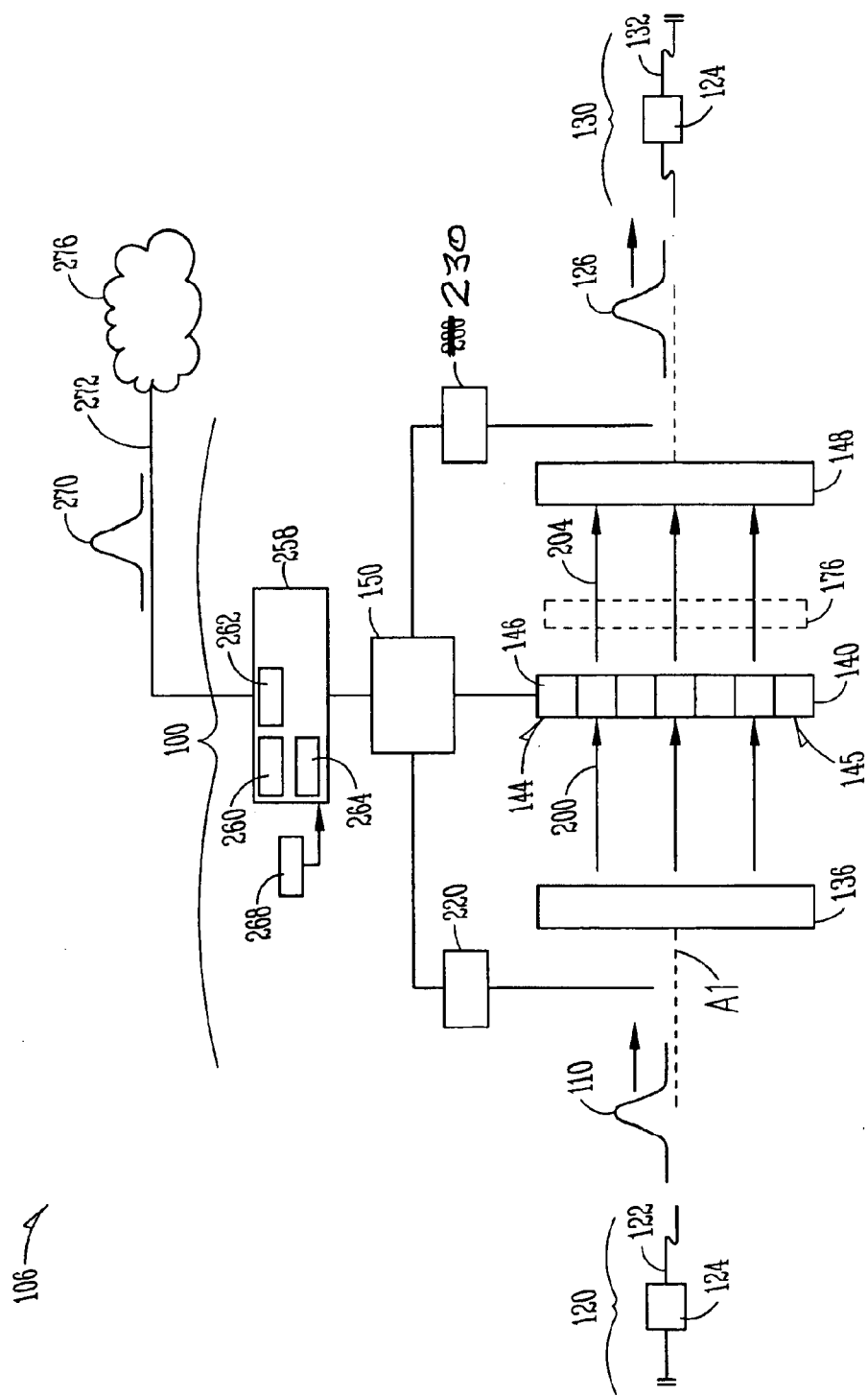
FIG. 1 is a schematic diagram of the chromatic dispersion compensation system of the present invention as part of a larger lightwave optical system for reducing chromatic dispersion in an optical signal caused, for example, by transmission through an optical system with chromatic dispersion.

With reference to FIG. 1, there is shown a phase vs. frequency compensation system 100 according to the present invention as part of an optical processing system 106. System 100 is illustrated in transmission mode for the sake of convenience and illustration, and one skilled in the art will appreciate that there are associated folded reflection-mode systems that have the identical or analogous properties as represented in the transmission mode schematic diagram of FIG. 1. Such systems are discussed below and shown in FIGS. 3–6.

System 100 can be used, for example, to compensate, reduce or otherwise alter the chromatic dispersion in an optical signal 10. As chromatic dispersion is a variation in the propagation velocity of the different frequency (or, equivalently, wavelength) components making up the optical signal, chromatic dispersion can be adjusted by imparting an appropriate phase to one or more of the frequency components based on a desired phase vs. frequency relationship. The discussion of system 100 and the various implementations of system 100 emphasizes polarization-independent chromatic dispersion compensation because the present invention is eminently suited to such a function. However, it will be apparent to one skilled in the art that system 100 can perform other polarization-independent phase vs. frequency adjustment functions, such as for example wavefront reconstruction, wavefront alteration, and pulse shaping.

Chromatic dispersion may be present in optical signal 10 and caused, for example, by the signal having passed through a first optical system 120 having chromatic dispersion. Optical system 120 may include, for example, a distance of optical fiber 122 having chromatic dispersion. Optical system 120 may also include other optical components, e.g., laser sources, amplifiers, switches, gratings, routers, lenses, couplers etc., collectively shown as an element 124, that are capable of introducing additional amounts of chromatic dispersion. Optical system 120 thus produces chromatic dispersion in optical signal 110 from one or more sources that, absent compensation, limits the bandwidth and/or fidelity of optical processing system 106 as a whole. In particular, chromatic dispersion causes pulse-broadening that, absent compensation, sets an upper limit for the bit rate period because of intersymbol interference.

A preferred consequence of compensating chromatic dispersion in optical processing system 106 is that it can optimize the usable bandwidth of optical signal 110. For example, performing chromatic dispersion compensation of optical signal 110 to form a compensated (i.e., phase-adjusted) signal 126 may be necessary to successfully transmit information through a second optical system 130, which may itself include sources of chromatic dispersion, such as an optical fiber 132 as well as other sources 124 of chromatic dispersion.

With continuing reference to FIG. 1, system 100 includes in order along an optical axis A1, a first dispersive module 136, and a polarization-independent spatial light modulator (PI-SLM) 140 having an active region 144 comprising an array 145 of independently programmable addressable regions 146. Also included downstream from PI-SLM 140 is a second dispersive module 148. Dispersive module 136 serves to spatially separate optical signal 110 into its frequency components 200 and direct these components onto active area 144 of PI-SLM 140. PI-SLM 140 is electronically connected to a controller 150 that controls the operation of the PI-SLM, as described below.

PI-SLM 140 may be one of a number of spatial light modulators that do not depend on the polarization of the input light signal, and that do not impart a polarization to a light signal. More generally, as used herein, a PI-SLM is any component or aggregation of components that defines an active area 144 having multiple, addressable regions 146 for adjusting the phase, and/or amplitude of light wavefronts incident on the regions. For example, the PI-SLM can have multiple, independently addressable regions such as a discrete array of independently addressable addressable regions. Alternatively, the PI-SLM can have multiple, addressable regions that partially overlap. For example, the PI-SLM can be a deformable mirror having multiple, addressable actuators that deform overlapping regions of the active area. Furthermore, other PI-SLMs can vary the phase, for example, by varying the refractive index of the addressable regions. In the example embodiment shown in FIG. 1, SLM 140 is electronically addressable through its connection with controller 150. In other embodiments, however, the SLM may be optically addressable. Dispersive module 136 directs frequency components 200 onto the multiple regions of SLM 140 so that there is a known relationship between each addressable region 146 and the particular frequency component or frequency components 200 incident on that region.

Thus, the PI-SLM can adjust the phase, and/or amplitude of the incident frequency components by, e.g., reflection, transmission, diffraction, or some combination thereof. As described further below, in many embodiments, the PI-SLM involves one or more liquid crystal layers, whose birefringence and/or orientation are controlled to provide a desired series of adjustments for each SLM addressable region. For example, the liquid-crystal PI-SLM may include twisted nematic liquid crystals, non-twisted nematic liquid crystals, and/or ferroelectric liquid crystals. In further embodiments, the PI-SLM can include an inorganic electro-optic modulator, e.g., a lithium niobate crystal coupled to a generator providing a spatially addressable E-field, or an acousto-optic modulator coupled to a transducer providing a spatially addressable acoustic wave.

Figure 2A:
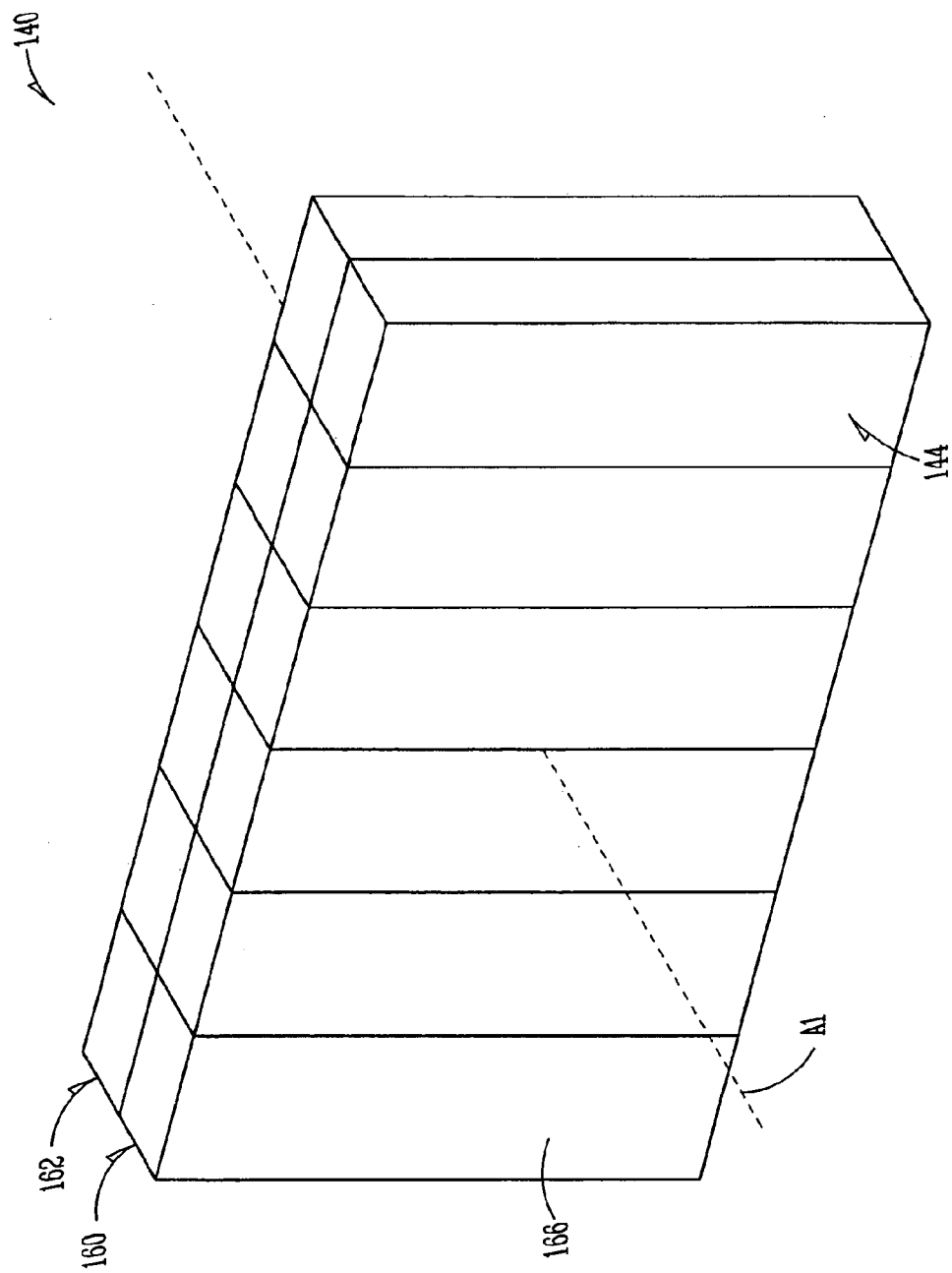
FIG. 2A is a close-up perspective view of a liquid-crystal-based SLM that is adaptable as one type of polarization-insensitive SLM (PI-SLM) suitable for use in the chromatic dispersion compensation system of FIG. 1.

In one example embodiment, PI-SLM 140 is a multi-layer liquid-crystal modulator, such as described in U.S. Pat. No. 5,719,650 (the '650 patent), which patent is incorporated herein by reference. As described in the '650 patent and as illustrated in FIG. 2A, liquid-crystal PI-SLM 140 includes in active region 144 first and second arrays 160 and 162 of adjacent polarization rotating or adjustable birefringent elements (addressable regions) 166. Elements 166 are aligned along a first axis in array 160 and a along a second axis (preferably, 90-degrees with respect to the first axis) in array 162.

In the present invention, liquid-crystal-based PI-SLM 140 of FIG. 2A needs to be adapted for use in system 100 so that it can be operated without concern for polarization effects, and in particular, without regard to the polarization of optical signal 110.

Specifically, if the liquid crystal alignment directions (axes) of arrays 160 and 162 are described as x and y, then the polarization transfer matrix $M(\omega)$ for the two-layered liquid crystal PI-SLM 140 is given by:

$$M(\omega) = \begin{pmatrix} e^{i\phi_x(\omega)} & 0 \\ 0 & e^{i\phi_y(\omega)} \end{pmatrix} \quad (EQ. 1)$$

wherein $\exp\{i\phi_x(\omega)\}$ and $\exp\{i\phi_y(\omega)\}$ are the phases shifts imparted by the SLM for array 160 and 162, respectively.

Thus, to obtain the output electric field vector $E_{OUT}(\omega)$ from the input electric field vector $EIN(Co)$ the following operation is performed:

$$E_{OUT}(\omega) = M(\omega) E_{IN}(\omega) \quad (EQ. 2)$$

By setting $\phi_x(\omega) = \phi_y(\omega)$, $M(\omega)$ becomes:

$$M(\omega) = \exp\{i\,\varphi_x(\omega)\}\begin{pmatrix} 1 & 0 \\ 0 & 1 \end{pmatrix} \quad (EQ. 3)$$

Thus, in the case of the liquid-crystal-based PI-SLM 140 of FIG. 2A, Equation 3 reveals that PI-SLM 140 can be arranged so that it does not change the SOP of light passing therethrough. Thus, the phase shift imparted by liquid-crystal PI-SLM 140 of FIG. 2A can be made independent of the polarization of the input electric field vector by aligning the respective liquid crystal axes of element 166 in array 160 and 162 at 90-degrees with respect to one another.

Figure 2B:
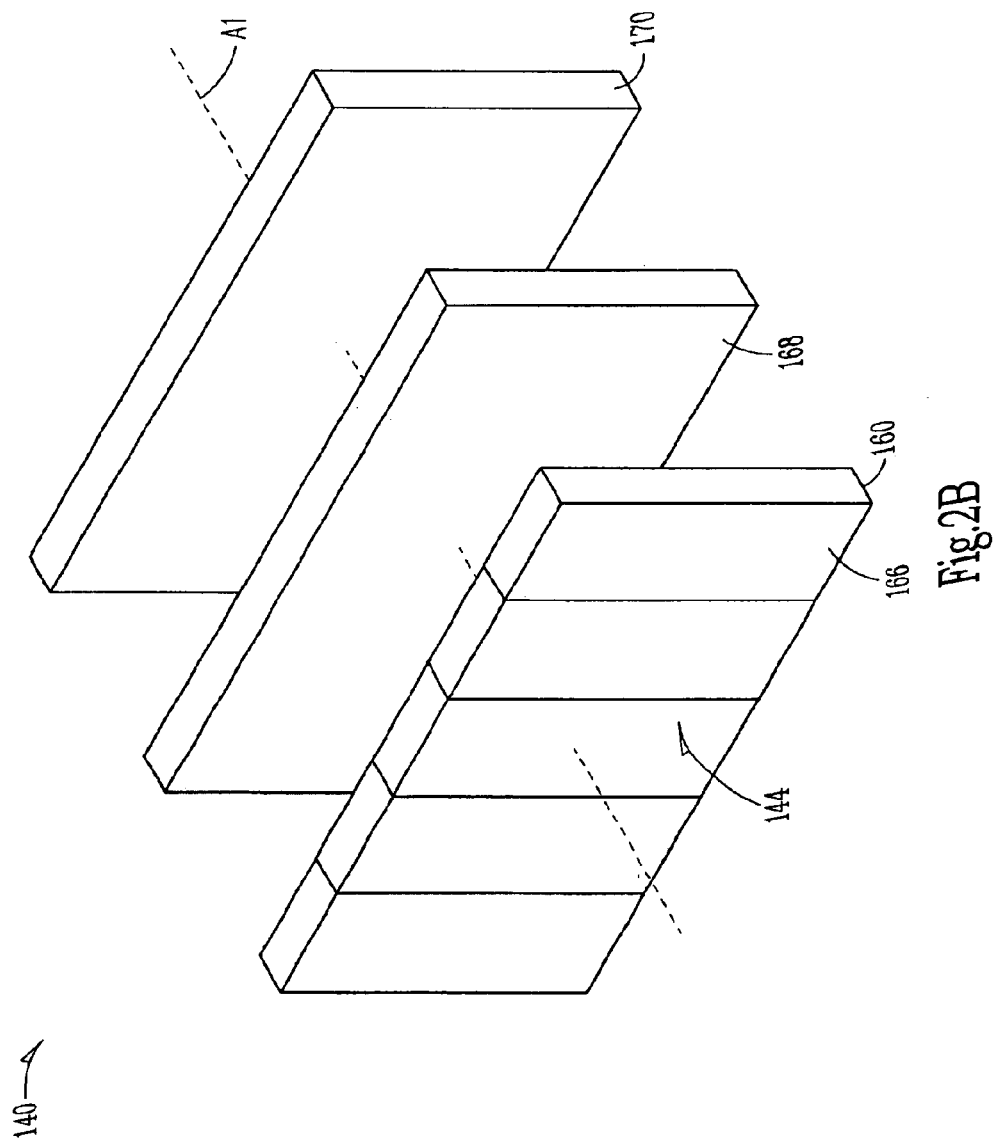
FIG. 2B is an exploded perspective view of a reflective single liquid crystal layer PI-SLM that includes a polarization-adjusting element between the liquid crystal array of addressable regions and the reflecting member.

With reference now to FIG. 2B, this effect can be achieved by a reflective SLM having a single array of liquid crystal addressable regions, wherein light passes twice through elements 166 in single array 160, and wherein a 90-degree polarization change is imparted to the light prior to it passing back through the array. This can be achieved, for example, by providing a polarization-adjusting element 168 (e.g., a wave-plate) between array 160 and reflective member 170 (e.g., a mirror), wherein the polarization-adjusting element is designed to impart a total of 90-degrees of polarization rotation upon the light passing twice through the element. As one example, this can be achieved by passing twice through a properly oriented quarter wave plate. As a second example, this can be achieved by the use of a Faraday mirror providing a total of 90-degrees of polarization rotation. In the latter case, polarization-adjustment element 168 and reflecting member 170 are combined.

For a given SLM element 166, both $\phi_x(\omega)$ and $\phi_y(\omega)$ can be adjusted by applying the appropriate voltage according to a phase vs. voltage calibration. Such voltage can be provided by controller 150, which is calibrated with the necessary pixel phase vs. voltage data, e.g., as look-up table. As long as elements 166 offer a range of phase variation greater than $2\pi$, $\phi_x(\omega)$ can be made equal to $\phi_y(\omega)$ and can be programmed to any desired value (modulo $2\pi$).

With reference again to FIG. 1, since PI-SLM 140 in general is made up of an array 145 of independently programmable addressable regions 146, different addressable regions can be programmed via controller 150 to impart different phases independently using different driving voltages. Combined with the spatial dispersion of frequencies (or equivalently, wavelength) afforded by dispersive module 136, different optical frequencies 200 are mapped onto different addressable regions 146. This allows for the arbitrary specification of phase vs. frequency, i.e., a programmable phase versus optical frequency function that is independent of the SOP of input optical signal 110. Again, calibration of the phase vs. voltage can be readily performed and the data stored (e.g., as a look-up table) so that the precise phase can be encoded onto the signal.

Ideally, one would like to avoid PDL in any of the elements in system 100. As the input SOP cannot be specified in system 100, one desires zero PDL, as with any optical processing system where the SOP is not maintained. However, first dispersive module 136 used for spectral dispersion can have an associated PDL. As PI-SLM 140 of the present invention is of the type that does not alter the SOP, one can optionally compensate for dispersive-module-induced PDL by inserting a half-wave ($\beta$2) polarization-adjusting element 176 (e.g., a half-wave plate, Faraday rotator, etc.) anywhere in system 100 between dispersive modules 130 and 148 (in FIG. 1, element 176 is shown in phantom between PI-SLM 140 and dispersive module 148). In a reflective arrangement, half-wave polarization-adjusting element 176 becomes a quarter-wave polarization-adjusting element, as discussed below. Further, as element 176 can be shown to introduce a simple rotation in polarization in compensated lightwave 126, a second half-wave polarization-adjusting element (not shown) can optionally be inserted after second dispersive module 148 to restore the polarization. A half-wave polarization-adjusting element gives a 90-degree rotation for the correct orientation of axes and a single pass. A quarter-wave polarization-adjusting element provides 90-degrees of polarization rotation with two passes for the correct orientation of axes.

With continuing reference to FIG. 1, controller 150 is programmed to cause PI-SLM 140 to selectively and independently adjust the phase (and optionally the amplitude) of different subsets of spatially separated frequency (or equivalently, wavelength) components 200 associated with addressable regions 146 to produce phase-adjusted, spatially-separated frequency components 204. Dispersive module 148 then spatially recombines adjusted frequency components 204 to produce an optical signal 126 that is compensated for chromatic dispersion (or, as discussed below, restored to its original state of not having any chromatic dispersion).

The phase to be imparted to each frequency component 200 of optical signal 110 can be based on information about the chromatic dispersion properties of a particular optical system (e.g., system 120 or 130) as measured or calculated (e.g., based on a model of chromatic dispersion effects of an optical system). Alternatively, information about chromatic dispersion can be acquired empirically by propagating a known optical signal (e.g., optical signal 110 or a test signal) through an optical system and measuring the chromatic dispersion effect.

In an exemplary embodiment of system 100, controller 150 controls PI-SLM 140 based at least in part on a feed forward detection signal from a detection system 220, which samples a portion of optical signal 110 to characterize its chromatic dispersion. In another exemplary embodiment, controller 150 controls PI-SLM 140 based at least in part on a feedback detection signal from detection system 230 that samples a portion of compensated optical signal 126 to characterize the effective reduction in the chromatic dispersion from system 100.

Furthermore, in another exemplary embodiment, controller 150 controls PI-SLM 140 based at least in part on signals from both detection systems 220 and 230.

Controller 150 includes the necessary power source and logic for independently applying electric fields (voltages) to each of respective addressable regions 146. Suitable power sources and logic are commercially available, e.g., from Cambridge Research and Instrumentation (CRI), Woburn, Mass. Controller 150 can also store appropriate calibration curves for array 145 so that the voltage necessary to impart a desired phase retardance is known. The algorithms can be implemented in computer programs or dedicated integrated circuits or computer-readable media (e.g., floppy disks or compact disks) using standard programming techniques.

Thus, in an exemplary embodiment of the present invention, controller 150 includes a computer system 258 (or may be linked to a computer system) that may be, for example, any digital or analog processing unit, such as a personal computer, workstation, a portion of a console, set top box, mainframe server, server-computer, laptop or the like capable of embodying the programmable aspect of invention described herein. In an example embodiment, computer 258 includes a processor 260, a memory device 262, and a data storage unit 264, all electrically interconnected. Data storage control unit 264 may be, for example, a hard drive, CD-ROM drive, or a floppy disk drive that contains or is capable of accepting and reading a computer-readable medium 268. In an example embodiment, computer-readable medium 268 is a hard disk, a CD, a floppy disk or the like. Computer-readable medium 268 may contain computer-executable instructions to cause controller 150 to perform the methods described herein. An example computer 258 is a Dell personal computer (PC) or Workstation, available from Dell Computer, Inc., Austin, Tex.

In another example embodiment, computer-readable medium 268 comprises a signal 270 traveling on a communications medium 272. In one example embodiment, signal 270 is an electrical signal and communications medium 272 is a wire, while in another example embodiment, the communications medium is an optical fiber and the signal is an optical signal. Signal 270 may, in one example, be transmitted over the Internet 276 to computer 258 and optionally onward to controller 150.

As described above in connection with system 100 of FIG. 1, controller 150 may receive feed forward or feedback signals from detection systems 220 and 230, respectively, which characterize the chromatic dispersion in optical signals 10 and 126, respectively. In relatively simple embodiments with few degrees of freedom, detection system 230 can monitor the mean pulse dispersion in adjusted optical signal 126 and provide a detection signal indicative of that dispersion to controller 150, which varies the adjustments imparted by PI-SLM 140 to minimize the pulse broadening due to chromatic dispersion (e.g., vary the phase imparted to each frequency by controlling the voltage provided to each pixel 146). In more complex embodiments, one or both of detection systems 220 and 230 can spectrally characterize the respective lightwave samples to provide sensing data to controller 150 for each of the spatially separated frequency components 200 incident on PI-SLM 140.

Preferably, one or both of detection systems 220 and 230 sense the spectral phase of the particular optical signal 110 and/or 126 on a wavelength-by-wavelength basis. Sensing of the spectral phase (or equivalently the frequency-dependent delay $\tau(\omega)$) can be achieved by using spectral interferometry techniques, cross-correlation techniques, and/or self-referencing measurement techniques, such as frequency resolved optical gating. Such techniques are described in, e.g., L. Lepetit et al., J. Opt. Soc. Am. B. 12, 2467–2474 (1995), K. Naganuma et al., Opt. Lett. 15, 393–395 (1990), and R. Trebino et al., Rev. Sci. Instrum. 68, 3277–3295 (1997), respectively.

With continuing reference to FIG. 1, dispersive modules 130 and 148 can include any dispersive element capable of spatially separating frequency components present in an optical signal. For example, they can include a diffraction grating (e.g., a reflective grating, transmissive grating, an amplitude grating, a phase grating, a holographic grating, echelle grating, arrayed-waveguide grating, etc.), a chromatic prism, and/or a virtually imaged phased array (VIPA). VIPAs are described in, for example, M. Shiraski, Opt. Lett., 21, 366 (1996), and Shiraski et al., IEEE Phot. Tech. Lett. 11, 1443 (1999).

Dispersive modules 130 and 148 may further include one or more imaging or relaying optics (e.g., lenses, mirrors, apertures, etc.) for directing the frequency components spatially separated by the dispersive element in module 130 onto PI-SLM 140 or for directing the adjusted frequency components from PI-SLM 140 to the dispersive element in dispersive module 148. Moreover, in additional exemplary embodiments of the present invention, the dispersive modules can be a single optical element that combines the dispersing and directing functions, such as a diffractive optical element (DOE).

Even where individual addressable regions of PI-SLM 140 provide many degrees of control over incident frequency components, the maximum amount of chromatic dispersion that can be compensated or reduced is limited by the spectral resolution of system 100. Generally, the parameters of dispersive module 136 are selected to fully exploit the entire pixel array 145 of PI-SLM 140. In other words, one tries to minimize the range of frequency components 200 on any one pixel 146 while also insuring that all frequency components of interest are incident on at least one pixel. Accordingly, spectral resolution can be made to scale with the number of independently addressable addressable regions 146 of PI-SLM 140.

For example, PI-SLM 140 may have, e.g., at least 2, 4, or 8 addressable regions, and preferably many more, e.g., 64, 128, etc. In any case, to avoid aliasing, spectral variations in the chromatic dispersion of the signal should be slow compared to the frequency width, denoted δf, of one pixel 146. This is equivalent to the requirement that the total duration of the signal to be compensated should be significantly below ½δf. The situation may be modified somewhat for embodiments in which the chromatically dispersed optical signal includes multiple signals on separate wavelength bands. In this case, dispersive modules 130 and 148 and PI-SLM 140 can be tailored to optimize spectral resolution within each band, whereas regions between separate bands may be ignored. Thus, the PI-SLM can have multiple sets of arrays 145, with each array dedicated to a particular wavelength band.

With continuing reference again to FIG. 1, dispersive module 136 and PI-SLM 140 combine to function as a programmable spectral phase equalizer by independently adjusting the phase of optical signal 126 on a wavelength-by-wavelength basis. The approach allows compensation of time-varying chromatic dispersion effects, at least down to the response time of PI-SLM 140. For a nematic liquid-crystal based PI-SLM (FIG. 2A), this response time is on the order of tens of milliseconds, which is fast enough to handle the majority of effects that cause chromatic dispersion.

It is worth remarking on the relationship between delay and spectral phase. For complete phase control, PI-SLM 140 only needs to vary the phase at each pixel 146 over a 0–2π radian range, which by itself constitutes a small phase delay. The frequency dependent group delay, however, varies as the derivative of phase with respect to frequency. In particular, frequency-dependent delay $\tau(\omega)$ is related to a spectral phase variation $\Psi(\omega)$ as shown in EQ. 4:

$$\tau(\omega) = -\frac{\partial \psi(\omega)}{\partial \omega} \quad \text{(EQ. 4)}$$

Therefore, even relatively large group delays that may be associated with chromatic dispersion, e.g., in the tens of picoseconds range, can be compensated using physical phase delays no larger than 2π. For visible and near infrared wavelengths, such phase delays correspond to a physical phase delay of only a few femtoseconds.

EXAMPLE EMBODIMENTS

As mentioned above, there are many specific examples of system 100 of FIG. 1. Several of these examples are described below for the sake of illustration, and one skilled in the art will appreciate that the examples provided in no way limit the general teaching of the chromatic dispersion compensation system of the present invention.
Transmission System with Liquid Crystal PI-SLM and Diffraction Gratings Referring now to FIG. 3, a first exemplary embodiment of system 100 is shown. In this embodiment, first dispersive module 136 includes a first grating 300 for receiving optical signal 110 and angularly dispersing its frequency components 200, and a first lens 306 having a focal length F1 for collimating the angularly dispersed frequency components and focusing them onto a liquid-crystal-based PI-SLM 140, and in particular onto first and second arrays 160 and 162 of elements 166 (FIG. 2A).

Optical signal 110 emanates from the end of an output optical fiber 122 as part of optical system 120 and is incident on first grating 300. The collimation and focusing of frequency components 200 can be accomplished by spacing lens 306 from each of grating 300 and PI-SLM 140 by a distance equal to its focal length F1. Thus, the grating and lens map the frequency content (i.e., components 200) of optical signal 110 onto SLM arrays 160 and 162. Moreover, because of the positioning of lens 306, grating 300, and PI-SLM 140, the spatial extent of any individual frequency component on arrays 160 and 162 is minimized. For each pixel, PI-SLM 140 independently adjusts the phase (and optionally the amplitude) of the frequency components 200 incident on the pixel (in FIG. 2A, only two frequency components 220 are shown for simplicity).

Second dispersive module 148 includes a second grating 320 and a second lens 326 having a focal length F2 for recombining the adjusted spatially-separated frequency components 204 into adjusted optical signal 126, which can then be coupled to an optical fiber 132 as part of second optical system 130. Like first dispersive module 136, lens 326 is preferably spaced from each of PI-SLM 140 and grating 320 by a distance equal to its focal length F2. In an example embodiment, the focal length of lenses 306 and 326 are the same (i.e., F1=F2=F), and thus the gratings, lenses, and SLM define a "4-F" arrangement.

An advantage of the present invention is that gratings 300 and 320 need not be polarization insensitive, since system 10 as a whole does not rely on knowledge of SOP of optical signal 110.

Figure 3:
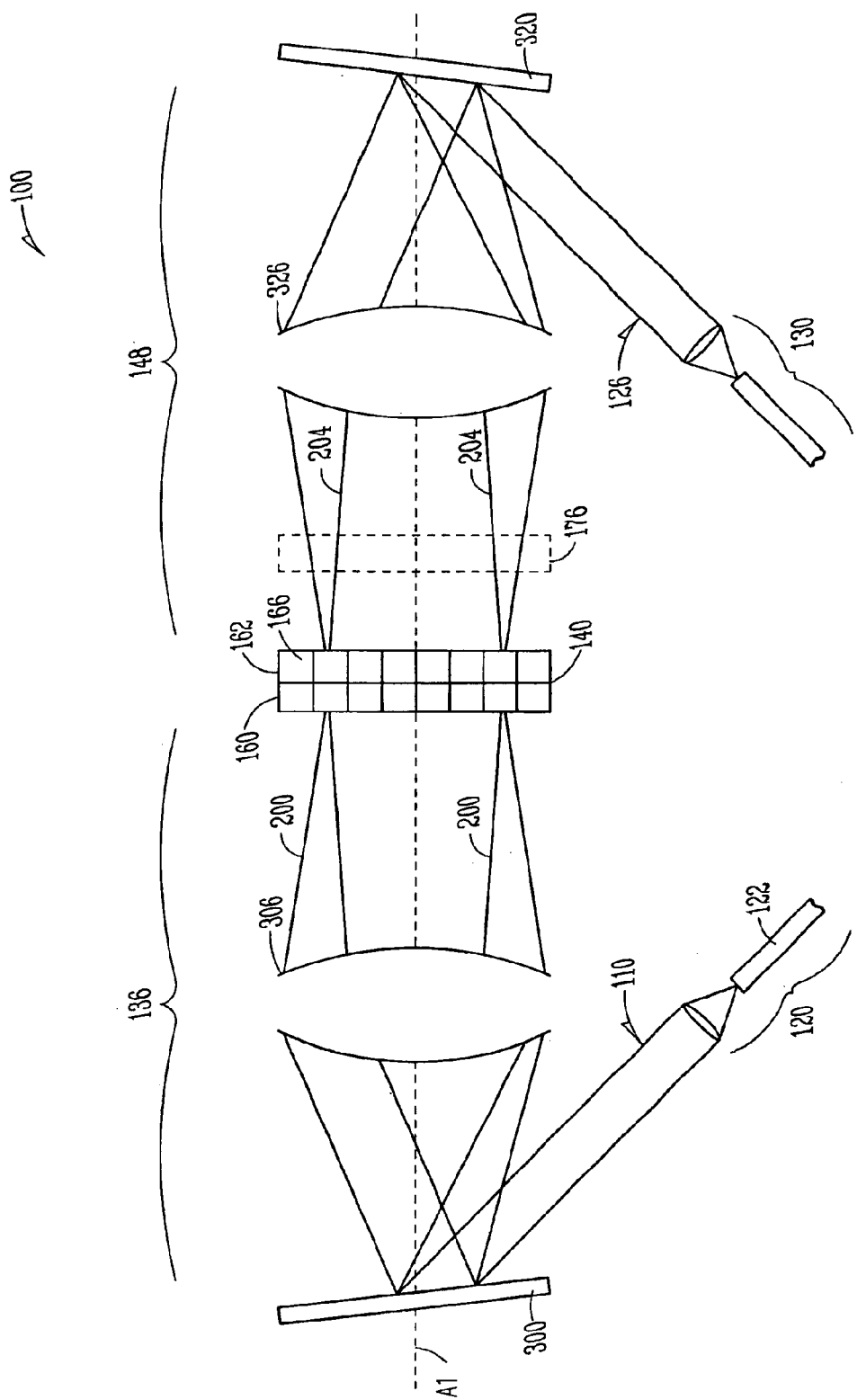
FIG. 3 is a schematic diagram of a transmission-mode embodiment of the chromatic dispersion compensation system of FIG. 1 that employs the two-layer liquid-crystal SLM of FIG. 2A, which is adapted to be polarization-independent, the system further including diffraction gratings in the dispersive modules.

In other embodiments of system 100 of FIG. 3, for example, lenses 306 and/or 326 can be replaced with curved mirrors having a radius of curvature equal to 2F, in which case the arrangement is folded. Similarly, the arrangement can be folded by using a reflective PI-SLM, as discussed below. Also, transmission gratings may be used instead of reflective gratings 300 and 320. One skilled in the art will appreciate the basic equivalency between folded reflected systems and unfolded transmission systems. Moreover, in additional embodiments, the dispersive modules and PI-SLM may be implemented, in whole or in part, as an integrated waveguide structure.

Depending on the nature of gratings 200, PDL can be significant. Thus, optionally included in system 100 of FIG. 3 is half-wave polarization-adjusting member 176 shown in phantom just downstream of PI-SLM 140, in order to reduce any PDL from gratings 200 and 320.
On-axis Reflection System with Diffraction Gratings With reference now to FIG. 4, an on-axis reflective system 100 is illustrated. System 100 of FIG. 4 is similar to the transmissive system of FIG. 3 in that it is an optically folded version thereof. In particular, system 100 of FIG. 4 includes a single optical fiber 122 serving as both the input and output fiber. This is made possible by connecting optical fiber 122 to a circulator 400 to which is also connected a first optical fiber 406 and a second optical fiber 408. A chromatically dispersed input optical signal 110 is provided by first optical fiber 406, and is passed to optical fiber 122 by circulator 400. Optical signal 110 is dispersed by grating 300 into its constituent frequency components 200 and imaged by lens 306 onto active area 144 of reflective PI-SLM 140. Addressable regions 146 of reflective PI-SLM 140 are programmed to impart the appropriate phase for each frequency, as described above, to create dispersion-compensated signal components 204 and reflect the components through lens 306 and to grating 300. A ¼-wave phase plate 410 (shown in phantom) is optionally provided to provide a total of ½-wave (i.e., 90-degrees) of total polarization rotation over two passes of the light through the plate, to limit PDL, as discussed above. The combination of lens 306 and grating 300 serves to recombine the frequency components to form compensated optical signal 126 and relay the optical signal back to optical fiber 122. Optical signal 126 propagates along optical fiber 122 until it encounters circulator 400, which directs optical signal 126 to second optical fiber 408.

On-axis Reflection System with Magnification

With continuing reference to FIG. 4, in order to disperse a given wavelength band across active area 144 of PI-SLM 140, lens 306 needs to have a certain focal length F1. The larger PI-SLM 140 and the narrower the wavelength band of optical signal 110, the longer focal length F1 must be. For many diffraction gratings, F1 must be on the order of 10 m to disperse a 1 nm band across a 1 cm active area 144. This makes for a very long optical path for system 100.

Figure 5A:
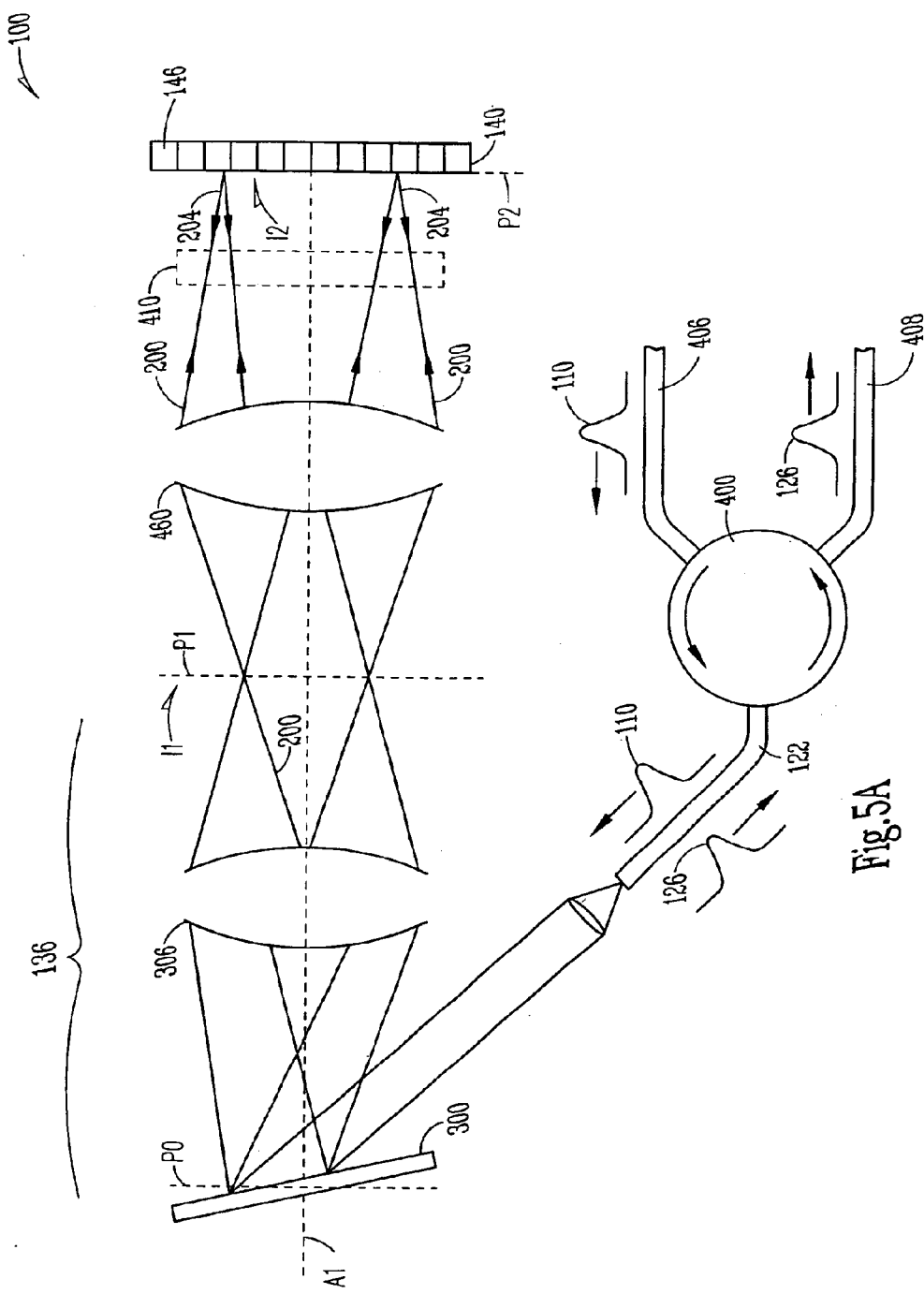
FIG. 5A is a schematic diagram of an on-axis reflection-mode embodiment of a chromatic dispersion compensation system similar to that of FIG. 4, but that includes an optical system having magnification to reduce the overall size of the system.

Accordingly with reference now to FIG. 5A, a compact on-axis reflective system 100 is illustrated. System 100 of FIG. 5A is similar to the reflective system of FIG. 4, except that magnification is introduced to shorten the system. Note that reflective designs by their nature are more compact than transmissive designs, and also tend to be more economical because the components can be employed to perform "double duty" by passing light through select components in two different directions.

Magnification is achieved in the present invention by forming an intermediate image I1 at an intermediate image plane P1 of spectral components 200 formed by grating 300 located at a plane P0. Image I1 is then used as an object for forming a magnified image I2 of the frequency components 200 at a second image plane P2 coincident with active area 144 of PI-SLM 140 using a magnifying optical system 460 arranged between planes P1 and P2. Thus, magnifying optical system 460 relays with magnification frequency components 200 onto active area 144. In general, the magnification provided is such that the optical path of system 100 is shortened as compared to the optical path without the introduction of magnification. The necessary magnification will depend, in part, on the size of active area 144 of PI-SLM 140 and the amount of dispersion of the frequency components provided by dispersive module 136.

Figure 5B:
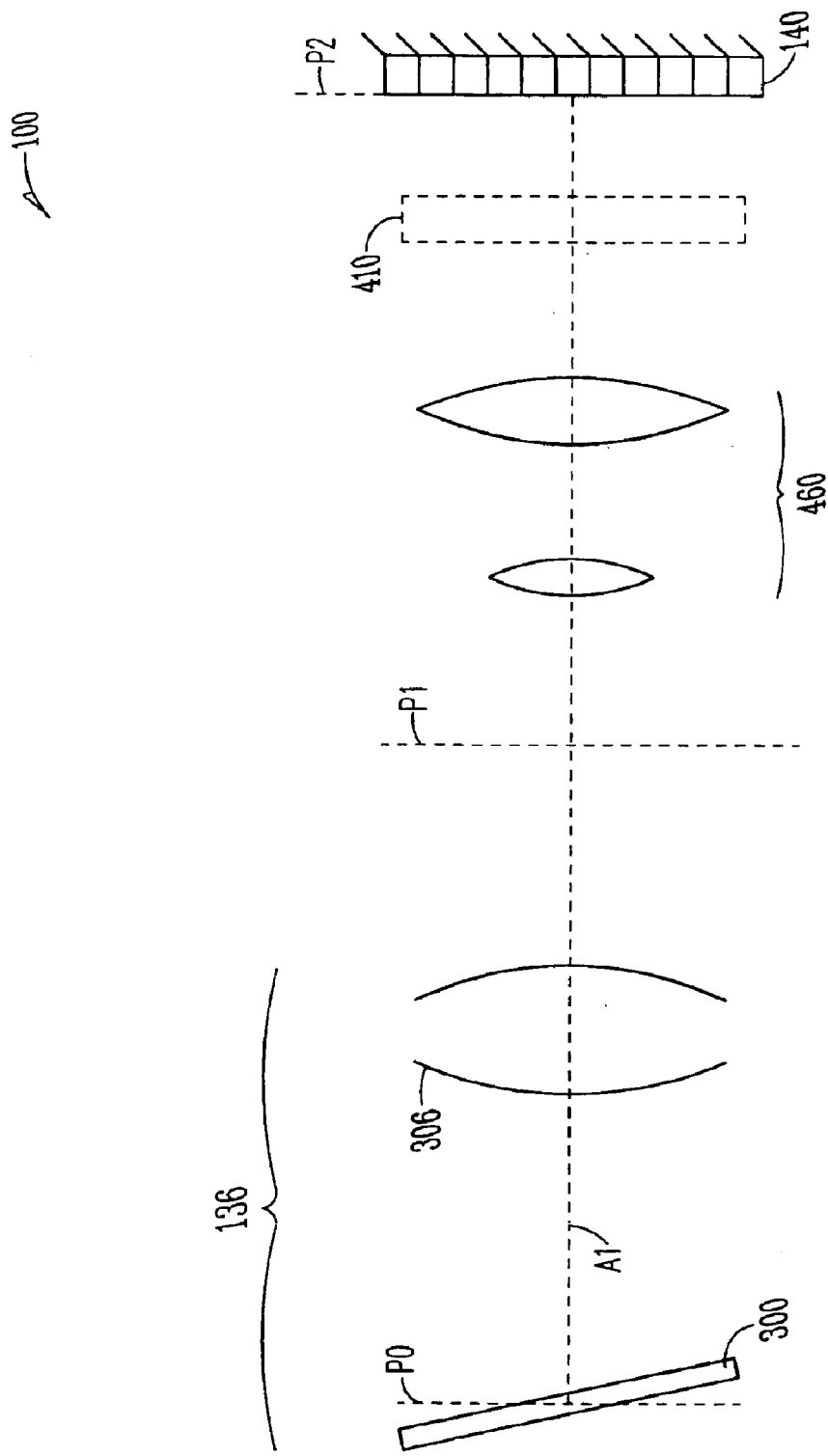
FIG. 5B is a schematic diagram of an example telescope embodiment of the magnification optical system of the chromatic dispersion compensation system of FIG 5A.

With reference to FIG. 5B, in an example embodiment optical system 460 includes a telescope with a first lens 470 having a focal length F4 and a second lens 476 having a focal length F5. Lens 306 has a focal length F1. In a preferred embodiment, the distance between planes P0 and P1 is 2F1 and the distance between plane P1 and P2 is set to 2(F4+F1). One skilled in the art will appreciate that the judicious arrangement and choice of lens 306 and the elements making up optical system 460 can significantly reduce the length of system 100 should the system otherwise prove to be too long for the particular application. Also, the magnification technique used in this reflective embodiment as an example is equally applicable to a transmissive system (e.g., system 100 of FIG. 2A).

Because the size of system 100 scales with the size of the active area 144 of PI-SLM 140, it can also be made compact by using an SLM with a smaller active area (i.e., aperture) 144 and smaller addressable regions 146 in addition to, or as an alternative to providing magnification. For example, certain liquid crystal SLMs have addressable regions (pixels) of typically about 100 microns, but also as small as 25 microns, which allowing 512 pixels to fit into a 12.8 mm aperture. Such an SLM is available from the Raytheon Company in Lexington, Mass. A similar SLM with 128 pixels would have an aperture of approximately 3 mm. A liquid crystal SLM from Boulder Nonlinear Systems, Boulder, Colo., has 4096 pixels, with a center-to-center pixel spacing of 1.8 microns and an aperture of 7.4 mm.

Thus, a small PI-SLM 140 has an aperture size of about 5 mm across, and in an example embodiment, has an aperture size of 3 mm or less. With a reflective system 100, using a PI-SLM having an active area of (3 mm×3 mm) and a magnification of 30 can result in system 100 having an overall length as small as, for example, 40 cm, for a 1 nm optical bandwidth. This system could be made more compact by folding the optical path using, for example, fold mirrors or fold prisms.

Off-Axis Reflection System

Figure 6:
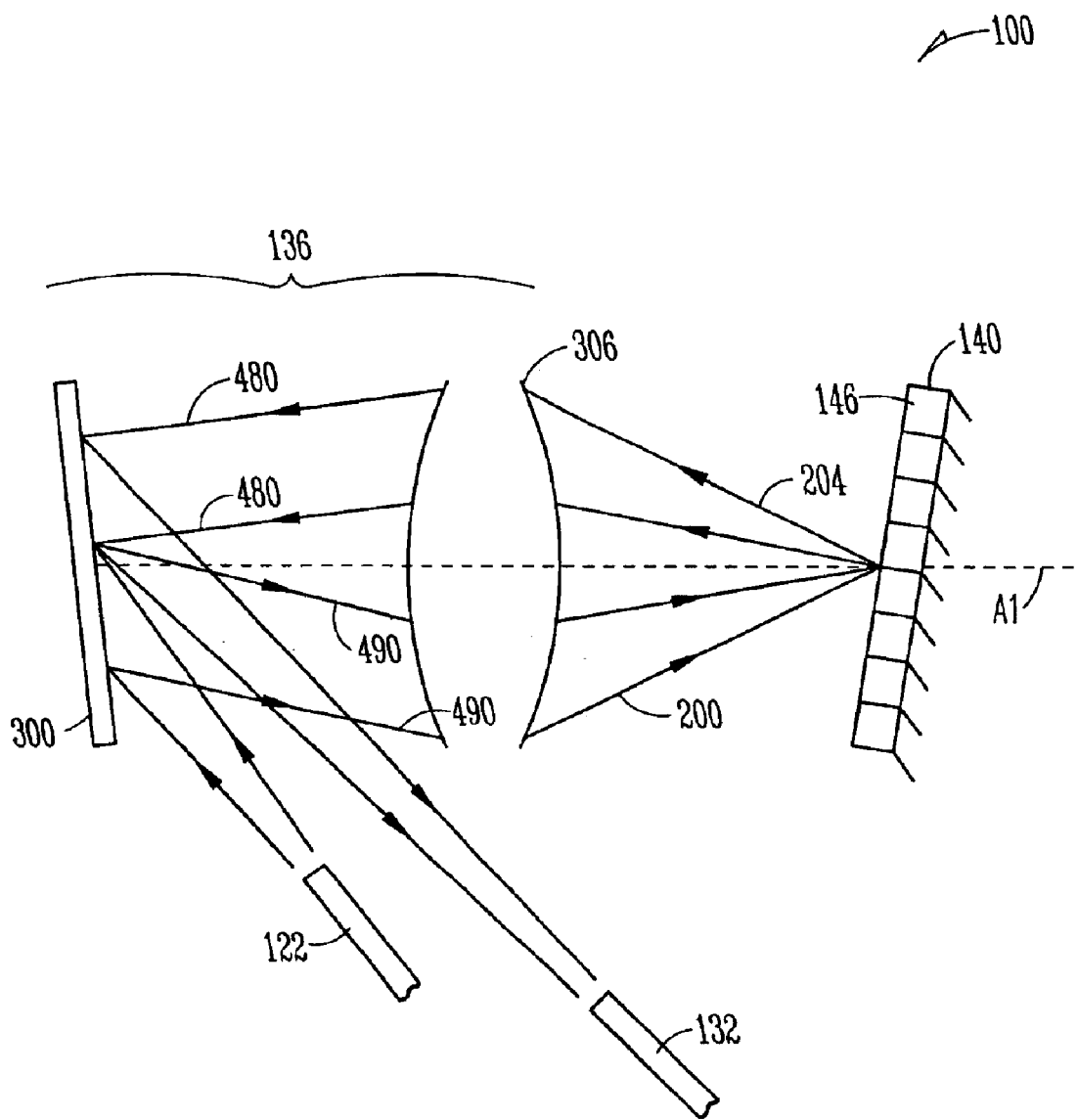
FIG. 6 is a schematic diagram of an off-axis reflection-mode embodiment of the chromatic dispersion compensation system of FIG. 1 similar to that of FIG. 4 and that employs input and output optical fibers.

With reference now to FIG. 6, there is shown another example embodiment of system 100 of the present invention that utilizes an off-axis reflective design. System 100 of FIG. 6 is similar to that of FIG. 4, except that reflective PI-SLM 140 is tilted relative to axis A1, so that the return path of light rays 480 from PI-SLM associated with compensated optical signal 126 are not coincident with the incident path of light rays 490 associated with incident optical signal 110. This allows for different input and output fibers 112 and 132 to be used, rather than a single fiber.

Optical Processing Systems Implementing the System 100

System 100 can also be implemented in optical processing system configurations other than that shown in FIG. 1. In particular, rather than compensating or reducing chromatic dispersion in an optical signal after it has passed through the optical system, system 100 can be used to pre-compensate an optical signal prior to its transmission through an optical system having chromatic dispersion. Furthermore, in addition to post-compensation and pre-compensation, system 100 can be used in an implementation that interrogates the optical system having chromatic dispersion, rather than sensing or detecting the actual optical signal itself. In addition, system 100 can be used to perform independent chromatic dispersion control of optical signals for independent WDM channels.

These various implementations are now described in greater detail below.

Post-Compensation Implementation

Figure 7A:
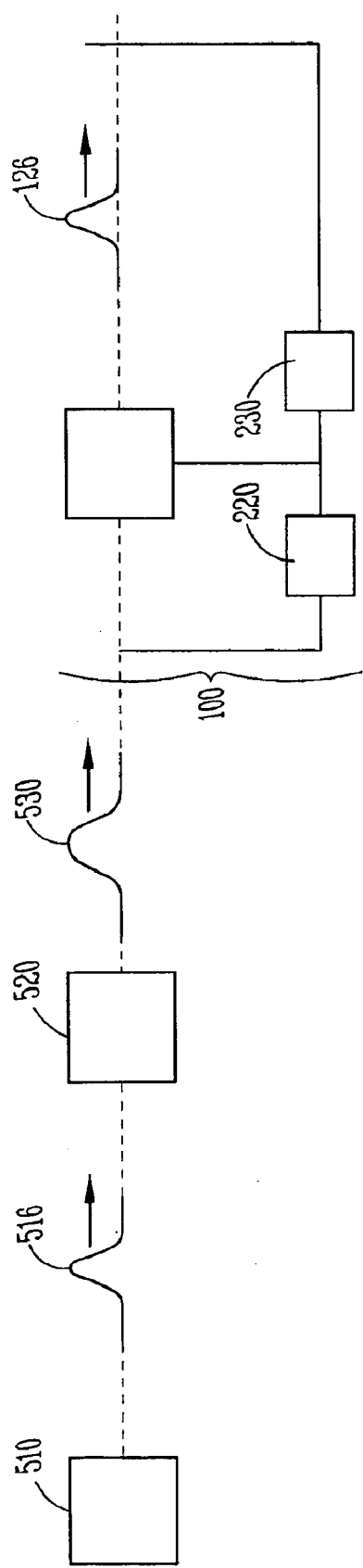
FIG. 7A is a schematic diagram of an optical processing system that includes the chromatic dispersion compensation system of the present invention, wherein the latter is used to perform post-compensation of an optical signal having passed through an optical system with chromatic dispersion.

With reference now to FIG. 7A, there is shown a source 510 for providing an undistorted optical signal 516, which passes through an optical system 520 having chromatic dispersion to produce a chromatically dispersed optical signal 530, akin to optical signal 110 of FIG. 1. Optical signal 530 then passes through system 100 (e.g., as shown generically in FIG. 1 or any of the specific embodiments thereof discussed above in the ensuing Figures) to reduce the chromatic dispersion in the signal and produce an adjusted optical signal 126. Signal 126 is detected by detection system 230 to monitor the degree of compensation and allow for iterative measurements and compensations to provide an optimally reduced chromatic dispersion. Signal 530 may also be detected by detection system 220 to determine the amount of compensation needed to be applied to signal 530 by system 100.

Pre-Compensation Implementation

Figure 7B:
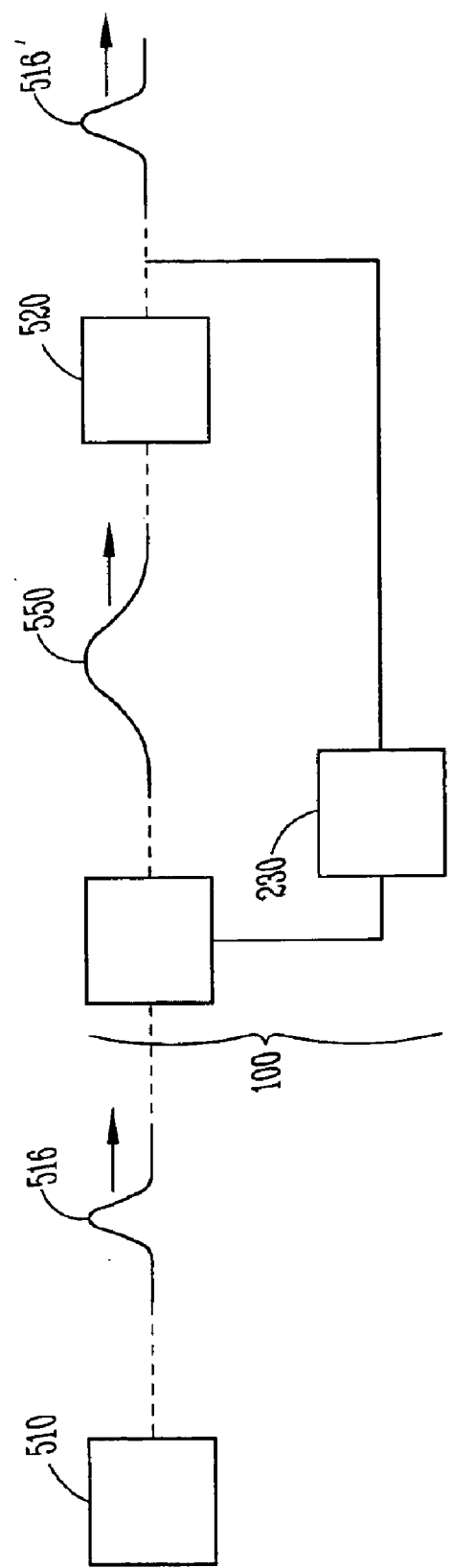
FIG. 7B is a schematic diagram of an optical processing system that includes the chromatic dispersion compensation system of the present invention, wherein the latter is used to perform pre-compensation of an optical signal to be passed through an optical system with chromatic dispersion.

With reference now to FIG. 7B, there is shown a pre-compensation implementation of chromatic dispersion compensation system 100. In particular, undistorted optical signal 516 first passes through system 100 that is adapted to alter signal 516 in a predetermined manner to counteract the anticipated effects of downstream optical system 520. The result is an optical signal 550 that includes a predetermined amount of chromatic dispersion. Optical signal 550 then passes through optical system 520. The chromatic dispersion imparted to signal 550, however, was selected to offset or reduce the impact of the chromatic dispersion caused by optical system 520. Thus, an optical signal 516' emerges from optical system 520 having reduced, if not fully compensated, chromatic dispersion. Accordingly, optical signal 516' closely resembles signal 516, if not identical thereto. In an exemplary embodiment, chromatic dispersion compensator 100 is guided by detection system 230, which provides a precompensation signal to controller 150 representative of the state of chromatic dispersion of optical signal 516', which is indicative of the chromatic dispersion effects in downstream optical system 520.

Optical System Compensation Implementation

With reference now to FIGS. 7C and 7D, there are shown optical processing systems involving post-compensation and pre-compensation implementations wherein the compensation of the optical signal is determined by interrogating optical system 520 directly, rather than by sensing or detecting an optical signal using detection systems (sensors) 220 and/or 230.

Accordingly, a sensor 580 is arranged to be in optical communication with optical system 520 and system 100, wherein the sensor is adapted to sense the chromatic dispersion of the optical system. This may carried out, for example, by providing one or more lightwave test signals 586 having particular characteristics (e.g., a set bandwidth, pulse length and/or pulse shape) through optical system 520, and measuring the amount of chromatic dispersion induced using system 100. System 100, via controller 150, processes the measurements and determines the amount of pre-compensation (FIG. 7D) or post-compensation (FIG. 7C) for chromatic dispersion is required for system 520. Once the amount of compensation is determined, then the actual input signal 516 can be emitted from source 510.

WDM Optical Processing System Implementation

Although the preceding paragraphs refer to compensation of pulse broadening caused by chromatic dispersion, it is noted that optical signals 110 and 126 (FIG. 1) may carry such pulse information on one or more different wavelength bands (channels). Thus, in one limit, the entire frequency bandwidth of the optical signal may be used to carry high-bandwidth, pulsed information (e.g., time-domain multiplexing or TDM), whereas, in the opposite limit, the frequency bandwidth of the optical signal is divided into separate wavelength bands, each simultaneously carrying lower-bandwidth pulsed information (e.g., wavelength-division multiplexing or WDM).

Figure 8A:
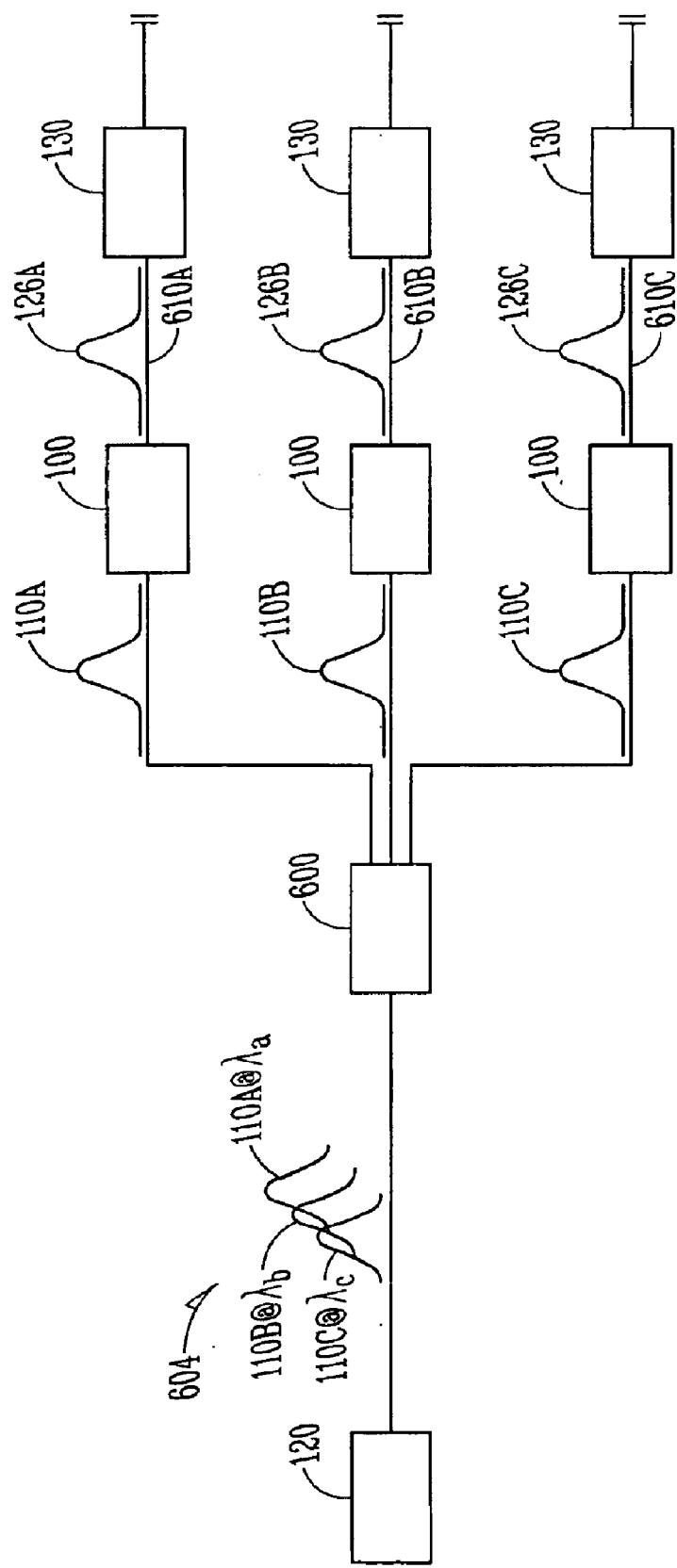
FIG 8A is an embodiment of an optical processing system that includes the chromatic compensation system of the present invention, wherein the signals associated with different WDM channels are individually compensated for chromatic dispersion and then received by respective optical systems.
Figure 8B:
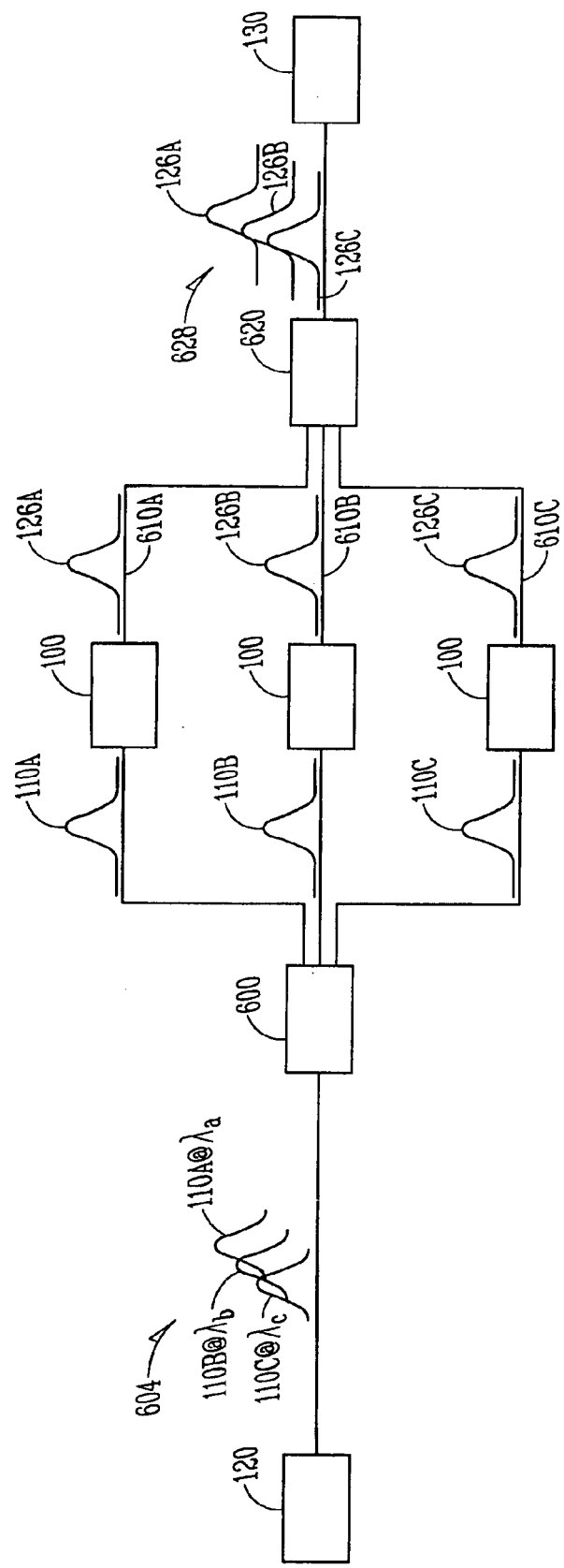
FIG. 8B is an embodiment of an optical processing system similar to that of FIG. 8A, but further including a multiplexer connected to each of the optical fibers that are connected to the respective chromatic dispersion compensation systems, for multiplexing the compensated signals.

Thus, with reference to FIGS. 8A and 8B, there is shown an optical processing system-level view of a system implementation that allows for independently compensating the optical signal associated with different WDM channels ("channel optical signals"). The system includes upstream optical system 120 and a multiplexed optical signal 604 comprising channel optical signals 110a, 110b and 110c centered at wavelengths λa, λb and λc, respectively, and each having a wavelength band Δλ. In an example embodiments, the channel spacing is 0.8 nm (i.e., 100 GHz), the wavelength band Δλ=0.1 nm (i.e., 12.5 GHz) λa, λb and λc=1550 nm, 1550.8 nm and 1551.6 nm. Three channel optical signals are used for the sake of illustration; clearly, greater or fewer channels optical signals can be used.

Channel optical signals 110a, 110b and 110c pass through a demultiplexer 600, which separates the channel signals so that they can be coupled into corresponding optical fibers 610a, 610b and 610c. Each of fibers 610a, 610b and 610c is coupled to a system 100. Systems 100, as described above, each adjust the phase of the frequency components of the corresponding channel optical signal so that the signal is compensated for chromatic dispersion, as described above. The result is compensated channel signals 126a, 126b and 126c traveling along optical fibers 610a, 610b and 610c.

With reference now to FIG. 8A, compensated channel signals 126a, 126b and 126c are then received by respective receiving optical systems 130, which in the present embodiment may simply be optical detectors that detect the optical signal and convert it to an electrical signal.

With reference now to FIG. 8B, the optical processing system of the present implementation may further include a multiplexer 620 that multiplexes compensated signals 126a, 126b and 126c to form a compensated WDM signal 628, which can then be passed along to optical system 130. The optical processing systems of FIGS. 8A and 8B can be used in either the pre-compensation or post-compensation modes.

WDM Compensation Using a Single PI-SLM

Figure 9:
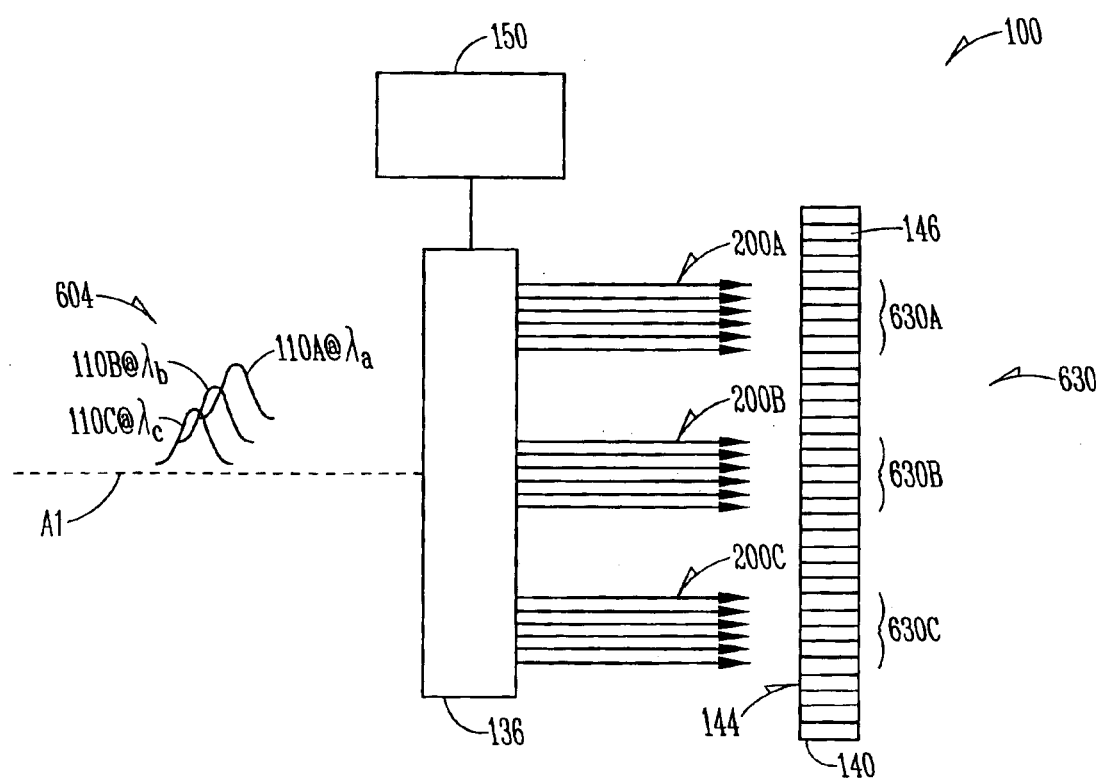
FIG. 9 is a close-up view of the first dispersive module and PI-SLM of system of FIG. 1 as used to perform chromatic dispersion compensation for a WDM signal having different channel optical signals, wherein the PI-SLM includes sets of addressable regions corresponding to the frequency components associated with each channel optical signal.

With reference now to FIG. 9, there is shown a close-up view of a portion of system 100 of FIG. 1, wherein multiplexed optical signal 604 comprising channel optical signals 110a, 110b and 110c centered at wavelengths λa, λb and λc, respectively, and each having a wavelength bandwidth Δλ. Three channel optical signals are used for the sake of illustration; clearly, greater or fewer channels optical signals can be used.

Multiplexed optical signal 604 is incident on dispersive module 136. The latter is designed to disperse not only the frequency components 200a–200c of the individual channel optical signals 110a, 110b and 110c, but also to disperse the different channels signals relative to one another. Thus, the different channel optical signals 110a–110c of multiplexed signal 604 are dispersed to different zones 630 (e.g., 630a–630c) on PI-SLM 140, with each zone containing a set of addressable regions 146. Thus, the addressable regions 146 in zones 630a–630c are dedicated to compensating the optical frequencies in the wavelength band Δλ centered around each wavelength λa–λc, respectively. This allows different channel optical signals centered at different wavelengths to be independently and simultaneously compensated and optimized. This is advantageous because chromatic dispersion properties vary across the wavelength spectrum, so that different optical signals centered around different wavelength bands will generally require different amounts of chromatic dispersion compensation.

It should be noted that this WDM chromatic dispersion correction approach requires a trade-off between the number of addressable regions per channel optical signal and the number of channel optical signals in the WDM signal. In an example embodiment, the number of addressable regions per channel optical signal is preferably between about 8 and 16. Further, the total number of addressable regions is preferably about 128 or greater.

CONCLUSION

The invention provides the capability to programmably control pulse broadening due to chromatic dispersion in optical fiber communication and networking systems. This capability allows optical fiber lightwave communication systems to run at higher speeds over longer distances by compensating chromatic dispersion, which is regarded as a key impairment for high performance lightwave communication systems.

The present invention can be applied both to very high-speed time-division multiplexed (TDM) and to wavelength division multiplexed (WDM) optical communications. In the case of WDM systems, several WDM channels can be compensated independently and can be programmed to achieve nearly arbitrary dispersion profiles in order to match the system requirements. The chromatic dispersion compensation system of the present invention can handle input optical signals with an arbitrary and unspecified SOP, and may be configured to provide substantially zero PDL. The programmable nature of the present invention allows for chromatic dispersion to be compensated under a variety of conditions and situations, including re-programming the chromatic dispersion compensation system when there is a change in the optical processing system configuration (e.g., the length of the network) that results in a change in the system chromatic dispersion.

A number of embodiments of the invention have been described. Nevertheless, it will be understood that various modifications may be made without departing from the spirit and scope of the invention. For example, some embodiments may incorporate both pre-compensation and post-compensation. In such case, a pre-compensation system may be used to match the wavelength-by-wavelength chromatic dispersion of an optical signal to the wavelength-by-wavelength chromatic dispersion of a downstream optical system. Thereafter, a post-compensation system can further reduce chromatic dispersion in the optical signal caused by the optical system.

Thus, while the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A system for programmably adjusting the phase of the frequency components of an optical signal of arbitrary polarization, comprising:
    a first dispersive module arranged to receive and disperse the optical signal into its frequency components;
    a polarization-independent spatial light modulator (PI-SLM) having an active area comprising a plurality of independently programmable addressable regions, the PI-SLM arranged to receive the frequency components on the active area; and
    a controller coupled to the PI-SLM wherein during operation the controller causes the PI-SLM to independently adjust the phase of one or more of the frequency components.

2. A system according to claim 1, wherein the PI-SLM is operated by the controller to alter chromatic dispersion in the optical signal.

3. A system according to claim 1, wherein the PI-SLM includes a multi-layer liquid-crystal spatial light modulator adapted to be polarization insensitive.

4. A system according to claim 1, wherein the PI-SLM is a programmably deformable mirror.

5. A system according to claim 1, wherein the PI-SLM includes a single liquid crystal layer, a polarization adjusting member and a reflective element, wherein the polarization-adjusting member imparts a total polarization rotation of 90-degrees to light passing twice therethrough.

6. A system according to claim 1, wherein the controller includes information pertaining to the amount of voltage to be supplied to each pixel to introduce a predetermined amount of phase change per pixel.

7. A system according to claim 1, further including a computer coupled to the controller, the computer capable of receiving and storing instructions for operating the controller.

8. A system according to claim 1, further including a second dispersive module downstream of the PI-SLM for re-combining the phase-adjusted frequency components to form a phase-adjusted optical signal.

9. A system according to claim 8, further including a polarization-adjusting element arranged between the first and second dispersive modules.

10. A system according to claim 9, wherein the PI-SLM is reflective and the polarization-adjusting element imparts a total of 90-degrees of polarization rotation so as to reduce polarization-dependent loss (PDL).

11. A system according to claim 9, wherein the PI-SLM is transmissive and the polarization-adjusting element imparts a total of 90-degrees of polarization rotation so as to reduce polarization-dependent loss (PDL).

12. A system according to claim 1, further including a first detection system coupled to the controller for detecting properties of the optical signal.

13. A system according to claim 12, further including a second detection system coupled to the controller for detecting properties of the phase-adjusted optical signal.

14. A system according to claim 1, wherein the first dispersive module includes one of a diffraction grating, a chromatic prism, an arrayed waveguide grating, and a virtually imaged phased array.

15. A system according to claim 1, wherein the PI-SLM is reflective.

16. A system according to claim 15, wherein the PI-SLM is one of a programmably deformable mirror, a micromirror array, a liquid-crystal based SLM, an electro-optic modulator and an acousto-optic modulator.

17. A system according to claim 1, wherein the PI-SLM is transmissive.

18. A system according to claim 17, wherein the PI-SLM is one of a programmably deformable mirror, a micromirror array, a liquid-crystal based SLM, an electro-optic modulator and an acousto-optic modulator.

19. A system according to claim 8, wherein the optical signal is emitted from a single optical fiber and a phase-corrected optical signal is received by the single optical fiber.

20. A system according to claim 19, further including a circulator to which the single optical fiber is coupled, and further including first and second optical fibers coupled to the circulator for respectively inputting the optical signal and outputting the phase-corrected optical signal.

21. A system according to claim 1, further including a polarization-adjusting member between the first dispersive module and the PI-SLM to reduce polarization-dependent loss (PDL).

22. A system according to claim 15, wherein the PI-SLM is arranged at an angle relative to an axis passing normally through the active area so that the optical signal and the phase-corrected optical signal do not traverse the same optical path.

23. A system according to claim 1, further including a magnification optical system arranged downstream of the first dispersive module and designed to relay with magnification the frequency components onto the active area of the PI-SLM.

24. A system according to claim 1, wherein the PI-SLM has an active area with a dimension of 5 mm or less.

25. A system according to claim 24, wherein the addressable regions each have a dimension of about 100 microns or less.

26. A system according to claim 24, wherein the PI-SLM is reflective, and further including a magnification optical system arranged between the first dispersive module and the PI-SLM, wherein the magnification of the magnification optical system is designed to make the system shorter than it would be without the magnification optical system.

27. A system according to claim 26, wherein the magnification optical system includes a telescope.

28. A system according to claim 1, wherein the optical signal is a multiplexed optical signal comprising different channel optical signals centered around different wavelengths, and wherein the active area is divided up into sets of addressable regions corresponding to frequency components of the different channel optical signals.

29. An optical processing system for at least partially pre-compensating an optical signal for chromatic dispersion effects present in a downstream optical system, the system comprising:
a first dispersive module positioned to receive the optical signal and spatially separate frequency components of the optical signal;
a polarization-independent spatial light modulator (PI-SLM) having an active area comprising a plurality of independently programmable addressable regions, the PI-SLM arranged to receive the spatially separated frequency components on the active area; and
a controller coupled to the PI-SLM and configured to receive a compensation signal indicative of the chromatic dispersion effects in the downstream optical system that allows for the PI-SLM to independently adjust the phase of one or more addressable regions in order to at least partially compensate the optical signal for chromatic dispersion of the downstream optical system.

30. A system according to claim 29, wherein the downstream optical system includes an optical fiber.

31. A system according to claim 29, wherein the compensation signal is obtained by providing a test signal to the downstream optical system.

32. An optical processing system for at least partially post-compensating an optical signal for chromatic dispersion effects present in an upstream optical system, the system comprising:
a first dispersive module positioned to receive the optical signal and spatially separate frequency components of the optical signal;
a polarization-independent spatial light modulator (PI-SLM) having an active area comprising a plurality of independently programmable addressable regions, the PI-SLM arranged to receive the spatially separated frequency components on the active area; and
a controller coupled to the PI-SLM and configured to receive a compensation signal indicative of the chromatic dispersion effects in the upstream optical system that allows for the PI-SLM to independently adjust the phase of one or more addressable regions in order to at least partially compensate the optical signal for chromatic dispersion of the upstream optical system.

33. A system according to claim 32, wherein the upstream optical system includes an optical fiber.

34. A system according to claim 32, wherein the compensation signal is obtained by providing a test signal to the upstream optical system.

35. A method of programmably adjusting the phase of the frequency components of an optical signal of arbitrary polarization, comprising:
spatially dispersing frequency components of the optical signal onto a polarization-independent spatial light modulator (PI-SLM) over an active area having a plurality of independently programmable addressable regions; and
independently adjusting one or more of the addressable regions to alter the phase of the corresponding frequency components incident thereon.

36. A method according to claim 35, further including recombining the phase-altered frequency components to produce a compensated optical signal.

37. A method according to claim 35, wherein the independently adjusting the one or more addressable regions is performed as post-compensation for chromatic dispersion present in the optical signal.

38. A method according to claim 35, wherein independently adjusting the one or more addressable regions is performed as pre-compensation for chromatic dispersion anticipated to be introduced into the optical signal.

39. A method according to claim 35, wherein adjusting of the one or more addressable regions is performed in response to monitoring the chromatic dispersion effects of an optical system.

40. A method according to claim 35, wherein adjusting the one or more addressable regions is performed in response to monitoring the chromatic dispersion in the optical signal having passed through an optical system.

41. A method according to claim 35, wherein adjusting the one or more addressable regions is performed in response to monitoring the chromatic dispersion in the optical signal prior to the optical signal passing through an optical system.

42. A method according to claim 35, wherein adjusting of the one or more addressable regions is performed in response to a control signal provided to the PI-SLM by a controller.

43. A method according to claim 42, wherein the control signal includes information based on a look-up table that relates an induced phase per pixel to a voltage provided to the addressable regions.

44. A method according to claim 35, wherein adjusting of the one or more addressable regions is based on a model of chromatic dispersion effects of an optical system.

45. A method according to claim 35, wherein the optical signal is a multiplexed optical signal comprising channel optical signals centered around different wavelengths, and wherein spatially dispersing the frequency components of the optical signal includes dividing up the active area of the PI-SLM into sets of addressable regions corresponding to the frequency components of the different channel optical signals.

46. A method according claim 45, wherein independently adjusting the one or more addressable regions includes further includes selectively phase-adjusting the frequency components of the channel optical signals using the corresponding sets of addressable regions to correct for chromatic dispersion present in the respective channel optical signals.

47. A method according to claim 35, wherein the PI-SLM includes liquid crystal addressable regions arranged to ensure the PI-SLM is polarization-insensitive.

48. A method according to claim 47, wherein the PI-SLM is reflective and includes a single array of liquid crystal addressable regions, a polarization-adjusting element, and a reflective member, wherein the polarization adjusting element is designed to provide a total polarization rotation of 90-degrees for light passing twice therethrough.

49. A method according to claim 35, wherein spatially dispersing the optical signal is performed by using a grating, a prism, an arrayed waveguide grating or a virtually imaged phase array.

50. A method according to claim 36, including adjusting the polarization to reduce polarization-dependent loss due to spatially dispersing the frequency components and/or recombining the phase-altered frequency components.

51. A method of reducing the chromatic dispersion in optical signals traveling in different WDM channels in a multiplexed optical signal, comprising:
demultiplexing the optical signals in the multiplexed optical signal; and performing chromatic dispersion compensation for each channel optical signal by spatially dispersing frequency components of each channel optical signal onto a polarization-independent spatial light modulator (PI-SLM) over an active area having a plurality of independently programmable addressable regions, and independently adjusting one or more of the addressable regions to alter the phase of the corresponding frequency components incident thereon, and then recombining the phase-altered components to form a compensated channel optical signal.

52. A method according to claim 51, further including separately detecting each compensated channel optical signal.

53. A method according to claim 51, further including: multiplexing the compensated channel optical signals to form a compensated multiplexed optical signal.

54. A method according to claim 51, wherein performing chromatic dispersion compensation includes altering the phase of the frequency components of the channel optical signals to compensate for chromatic dispersion effects induced by an upstream optical system.

55. A method according to claim 51, wherein performing chromatic dispersion compensation includes altering the phase of the frequency components of the channel optical signals to compensate for anticipated chromatic dispersion effects of a downstream optical system.

56. A method of programmably adjusting the phase of the frequency components of an optical signal of arbitrary polarization over a short optical path, comprising:

spatially dispersing frequency components of the optical signal onto a polarization-independent spatial light modulator (PI-SLM) over an active area having a dimension of 5 mm or less and a plurality of independently programmable addressable regions within the active area; and independently adjusting one or more of the addressable regions to alter the phase of the corresponding frequency components incident thereon.

57. A method according to claim 56, further including relaying the spatially dispersed frequency components to the active area with magnification so that the optical path is shortened as compared to the optical path without magnification.

58. A method according to claim 56, wherein the PI-SLM is reflective.

* * * * *